United States Patent
Chou et al.

(10) Patent No.: US 10,203,805 B2
(45) Date of Patent: Feb. 12, 2019

(54) TOUCH DETECTION METHOD OF A TOUCH DETECTION DEVICE FOR OBTAINING A CALIBRATED VARIATION FOR DETERMINING WHETHER A TOUCH EVENT HAS BEEN TRIGGERED

(71) Applicant: ITE Tech. Inc., Hsinchu (TW)

(72) Inventors: Yi-Chung Chou, Taipei (TW);
Ming-Heng Tsai, Hsinchu (TW);
Hsu-Min Chen, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 99 days.

(21) Appl. No.: 15/372,418

(22) Filed: Dec. 8, 2016

(65) Prior Publication Data

US 2017/0255329 A1  Sep. 7, 2017

(30) Foreign Application Priority Data

Mar. 2, 2016  (TW) .............................. 105106266 A

(51) Int. Cl.
*G06F 3/041*  (2006.01)
*G06F 3/044*  (2006.01)

(52) U.S. Cl.
CPC ............ *G06F 3/0418* (2013.01); *G06F 3/044* (2013.01)

(58) Field of Classification Search
CPC ........ G06F 3/041; G06F 3/0418; G06F 3/044; G06K 9/00; G06K 9/62; H03K 17/96; H03K 17/962; G01R 27/26; G01R 27/2605; G01D 5/24
See application file for complete search history.

(56) References Cited

U.S. PATENT DOCUMENTS

| | | | |
|---|---|---|---|
| 9,128,573 B2 * | 9/2015 | Angelini | G06F 3/0416 |
| 9,164,137 B2 * | 10/2015 | Page | G01R 27/2605 |
| 9,317,169 B2 * | 4/2016 | Tokita | G06F 3/0412 |
| 9,436,326 B2 * | 9/2016 | Jo | G06F 3/0418 |
| 9,791,986 B2 * | 10/2017 | Ouh | G06F 3/044 |
| 9,864,467 B2 * | 1/2018 | Tai | G06F 3/044 |
| 2011/0227864 A1 * | 9/2011 | Baek | G06F 3/0418 345/174 |
| 2011/0261005 A1 * | 10/2011 | Joharapurkar | G06F 3/0418 345/174 |
| 2012/0218222 A1 * | 8/2012 | Shen | G06F 3/0418 345/174 |
| 2013/0300707 A1 | 11/2013 | Hershman | |

(Continued)

FOREIGN PATENT DOCUMENTS

| | | |
|---|---|---|
| TW | 201423508 A | 6/2014 |
| TW | 201430664 A | 8/2014 |
| TW | 201501004 A | 1/2015 |

*Primary Examiner* — Sardis F Azongha
(74) *Attorney, Agent, or Firm* — Winston Hsu

(57) ABSTRACT

A touch detection method includes outputting a first signal via an output terminal of a processing unit; receiving a second signal via an input terminal of the processing unit where a voltage level of the second signal corresponds to a voltage level of the first signal, a first capacitance of a first capacitor and a second capacitance of a second capacitor; performing a calibration calculation to the variation of voltage level of the second signal by using a calibration parameter for obtaining a calibrated variation; and determining a touch event has been triggered if the calibrated variation has passed a threshold.

19 Claims, 6 Drawing Sheets

(56) References Cited

U.S. PATENT DOCUMENTS

| | | | | |
|---|---|---|---|---|
| 2013/0307813 A1* | 11/2013 | Hanssen | ................ | G06F 3/044 345/174 |
| 2014/0043279 A1* | 2/2014 | Pedersen | ............... | G06F 3/0416 345/174 |
| 2014/0104223 A1* | 4/2014 | Hanssen | ................ | G06F 3/044 345/174 |

* cited by examiner

TOUCH DETECTION METHOD OF A TOUCH DETECTION DEVICE FOR OBTAINING A CALIBRATED VARIATION FOR DETERMINING WHETHER A TOUCH EVENT HAS BEEN TRIGGERED

CROSS REFERENCE TO RELATED APPLICATION

This application claims priority to Taiwan Patent Application No. 105106266, filed Mar. 2, 2016, and incorporated herein by reference in its entirety.

BACKGROUND OF THE INVENTION

1. Field of the Invention

The present invention relates to a touch detection method, and more particularly, a touch detection method of a touch detection device used to perform calibration.

2. Description of the Prior Art

Presently, a touch detection device determines whether a touch event has been triggered by charging a capacitor with an output signal, and then receiving an input signal corresponding to the discharge from the capacitor. In order to charge and discharge the capacitor, the mentioned output signal and input signal should be digital signals such as square waves. A filtering process is thus difficult to be performed, and unwanted noise may not be filtered out, resulting in a high signal-to-noise ratio (SNR). Moreover, a touch panel may have a plurality of touch portions, and different touch portions may correspond to different detection sensitivities. A touch gesture may be therefore recognized unsuccessfully. For example, when the touch portions have different areas, a gesture may cause different signal variations in different touch portions because the touch portions have different areas. The effect of touch control related to a gesture may vary by the touch portion, making recognition of the gesture difficult.

SUMMARY OF THE INVENTION

An embodiment of the preset invention provides a touch detection method of a touch detection device. The touch detection device may include a processing unit, a first capacitor and a second capacitor. A first terminal of the first capacitor may be coupled to an output terminal of the processing unit. A second terminal of the first capacitor may be coupled to an input terminal of the processing unit and a first terminal of the second capacitor. A second terminal of the second capacitor may be coupled to a ground terminal. The touch detection method may include outputting a first signal via the output terminal of the processing unit; receiving a second signal via the input terminal of the processing unit, wherein a voltage level of the second signal corresponds to a voltage level of the first signal, a first capacitance of the first capacitor and a second capacitance of the second capacitor; calibrating a variation of the voltage level of the second signal by using a calibration parameter to obtain a calibrated variation; and determining a touch event has been triggered if the calibrated variation is greater than a threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
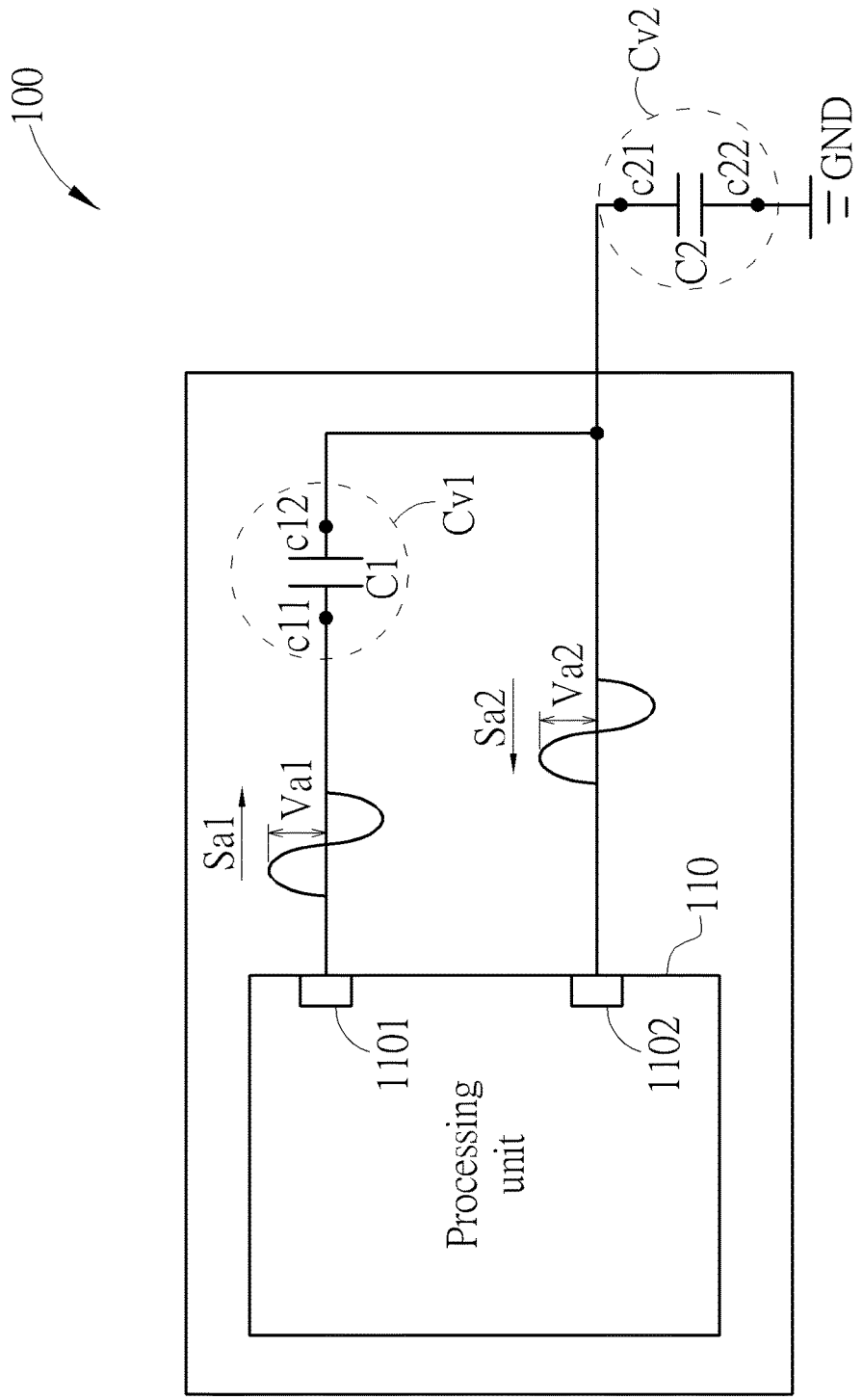
FIG. 1 illustrates a touch detection device according to an embodiment of the present invention.

FIG. 1 illustrates a touch detection device 100 according to an embodiment of the present invention. The touch detection device 100 may include a processing unit 110, a first capacitor C1 and a second capacitor C2. A first terminal c11 of the first capacitor C1 may be coupled to an output terminal 1101 of the processing unit 110. A second terminal c12 of the first capacitor C1 may be coupled to an input terminal 1102 of the processing unit 110 and a first terminal c21 of the second capacitor C2. A second terminal c22 of the second capacitor C2 may be coupled to a ground terminal GND. The output terminal 1101 of the processing unit 110 may be used to output a first signal Sa1 (corresponding to a voltage level Va1), and the input terminal 1102 of the processing unit 110 may be used to receive a second signal Sa2 (corresponding to a voltage level Va2). The first capacitor C1 may have a first capacitance Cv1. The second capacitor C2 may have a second capacitance Cv2. In FIG. 1, the second voltage level Va2 of the second signal Sa2 may be corresponding to the first voltage level Va1 of the first signal Sa1, the first capacitance Cv1 of the first capacitor C1 and the second capacitance Cv2 of the second capacitor C2. The relationship may be described with the equation (eq-1):

$$Va2 = Va1 * [Cv1/(Cv1+Cv2)] \quad \text{(eq-1).}$$

Figure 2:
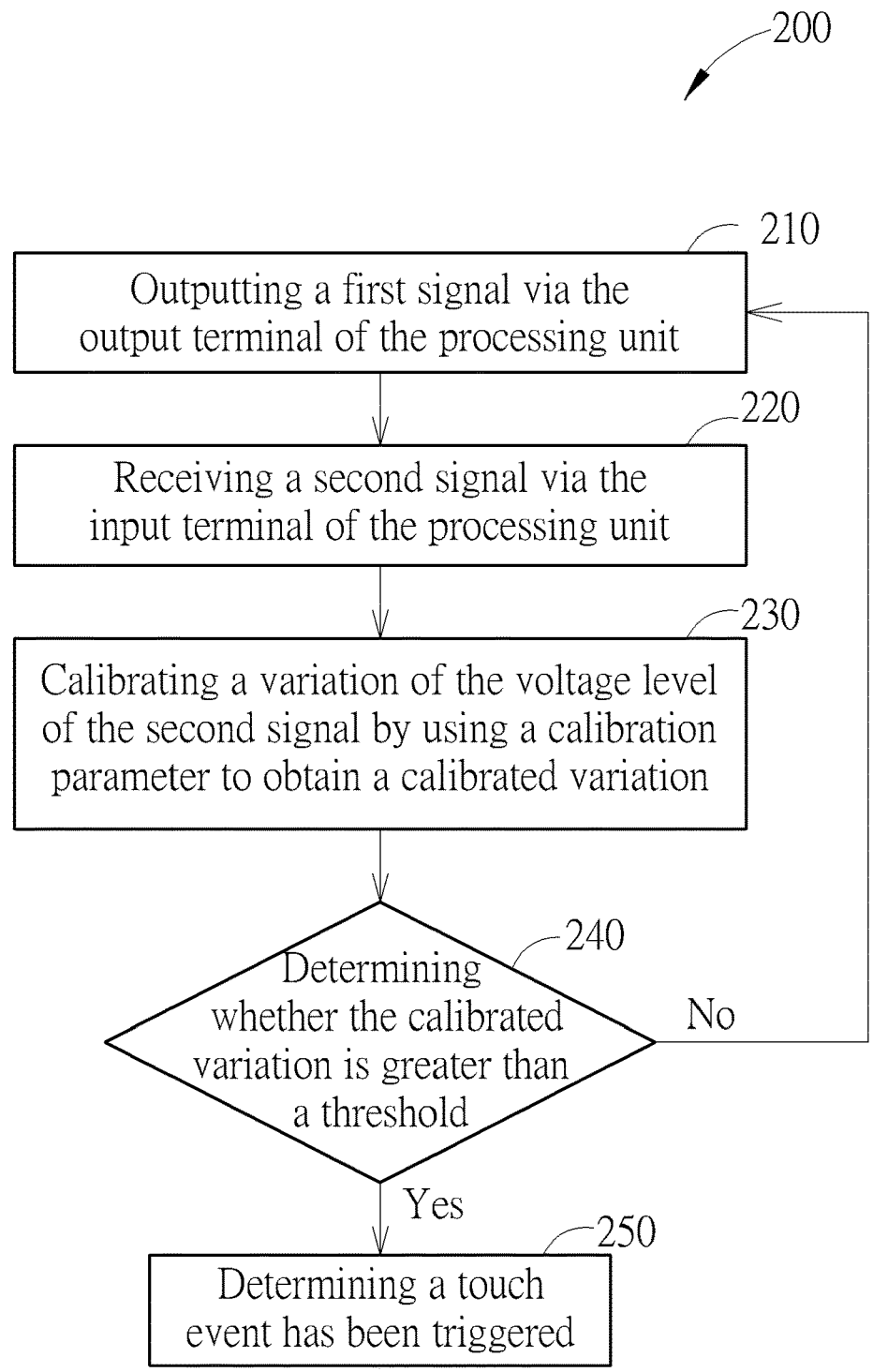
FIG. 2 illustrates a flowchart of a touch detection method according to an embodiment of the present invention.

FIG. 2 illustrates a flowchart of a touch detection method 200 according to an embodiment of the present invention. Referring to FIG. 1, the touch detection method 200 may include:

Step 210: outputting a first signal Sa1 via the output terminal 1101 of the processing unit 110;

Step 220: receiving a second signal Sa2 via the input terminal 1102 of the processing unit 110;

Step 230: calibrating a variation $\Delta Va2$ of the voltage level Va2 of the second signal Sa2 by using a calibration parameter P to obtain a calibrated variation $\Delta Va2'$;

Step 240: determining whether the calibrated variation $\Delta Va2'$ is greater than a threshold; if so, perform step 250; else perform step 210; and Step 250: determining a touch event has been triggered.

In step 220, the voltage level Va2 of the second signal Sa2 may be corresponding to the voltage level Va1 of the second signal Sa1, the first capacitance Cv1 and the second capacitance Cv2. When the touch event has not been triggered yet, the voltage level Va2 may be expressed with the abovementioned equation (eq-1), and the voltage level Va2 may be kept without being changed so that the variation $\Delta Va2$ of the voltage level Va2 may be zero substantially. In steps 230 and 240, the calibrated variation $\Delta Va2'$ may be smaller than the threshold, so it is determined that a touch event has not been triggered yet. When a touch event has been triggered, the voltage level Va2 may vary correspondingly, and the variation ΔVa2 may be observed to be greater than the threshold in steps 230 to 240, so a touch event may be determined to be being triggered.

According to an embodiment of the present invention, the abovementioned first signal Sa1 may be a first analog signal, and the second signal Sa2 may be a second analog signal. The first signals Sa1 and the second signal Sa2 may be in the form of sine wave so as to improve the effect of noise filtering. According to an embodiment of the present invention, the calibration parameter P in step 230 may be proportional to the first capacitance Cv1. According to an embodiment of the present invention, the calibration parameter P may be proportional to the second capacitance Cv2. Details are described as below.

Figure 3:
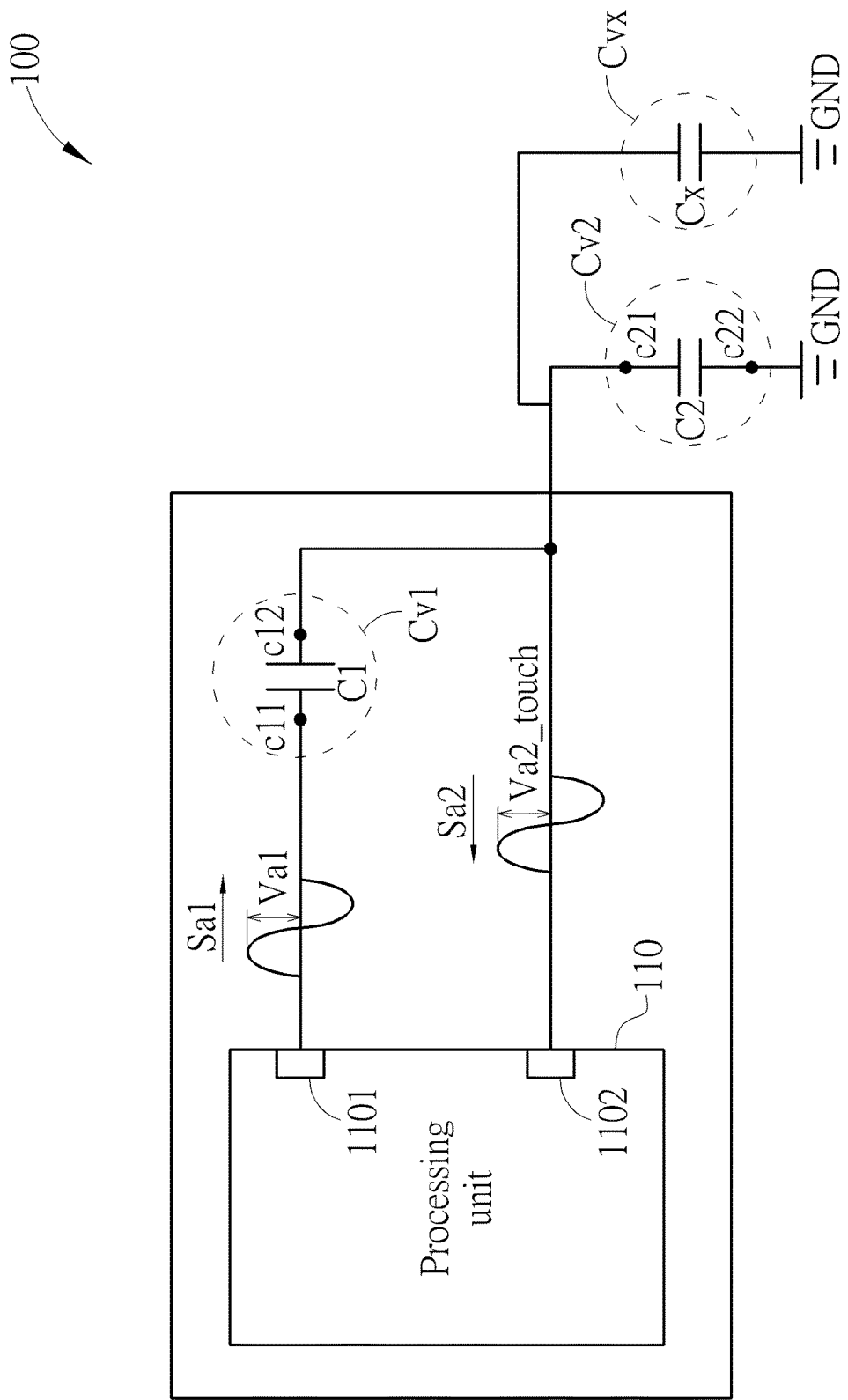
FIG. 3 illustrates that a touch event is triggered on the touch detection device of FIG. 1 according to an embodiment of the present invention.

FIG. 3 illustrates that a touch event is triggered on the touch detection device 100 of FIG. 1 according to an embodiment of the present invention. The mentioned touch event may be corresponding to a condition of an external object Cx touching the touch detection device 100. The external object Cx may be a finger or a stylus, for example. The external object Cx may have a third capacitance Cvx. When a touch event has been triggered, comparing the voltage level Va2_touch of the second signal Sa2 with the voltage level Va2 obtained before the touch event, the variation ΔVa2 may be corresponding to the first capacitance Cv1, the second capacitance Cv2, the third capacitance Cvx and the voltage level Va1 of the first signal Sa1 as illustrated in equation (eq-2):

$$Va2\_touch = Va1 * [Cv1/(Cv1+Cv2+Cvx)] \quad \text{(eq-2)}.$$

Hence, the voltage levels of the second signal Sa2 before and after the touch event may be used to generate the variation ΔVa2 as the equation (eq-3):

$$\begin{aligned}\Delta Va2 &= Va2 - Va2\_touch \\ &= Va1*[Cv1/(Cv1+Cv2)] - Va1*[Cv1/(Cv1+Cv2+Cvx)] \\ &= Va1*Cv1*Cvx/[(Cv1+Cv2)*(Cv1+Cv2+Cvx)].\end{aligned} \quad \text{(eq-3)}$$

When the touch event is triggered, a greater variation ΔVa2 is associated with a higher sensitivity of the detection. For obtaining a maximized variation ΔVa2, a relationship Cv1+Cv2>>Cvx may be assumed, and the equation (eq-3) may be used to derive a partial differential equation (eq-4):

$$\partial\Delta Va2/\partial Cv1 = Cvx*Va1*(Cv2^2-Cv1^2)/(Cv1+Cv2)^4 \quad \text{(eq-4)}.$$

When the variation ΔVa2 is of a maximum, it may be derived that ∂ΔVa2/∂Cv1=0. Cv1=Cv2 may be derived. In other words, according to an embodiment of the present invention, the first capacitance Cv1 may be adjusted to be equal to the second capacitance Cv2 substantially. When Cv1=Cv2, according to the equation (eq-1), the voltage level Va2 before the touch event is triggered may be equal to half the voltage level Va2 after the touch event has been triggered. Since the variation ΔVa2 may be of a maximum, the sensitivity of the detection of the touch detection device 100 may be optimized. The result of Cv1=Cv2 may be used in equation (eq-3), and the relationship of Cvx<<Cv2 may be considered, so the variation ΔVa2 obtained by using the voltage levels of the second signal Sa2 before and after the touch event may be described as equation (eq-5):

$$\begin{aligned}\Delta Va2 &= Va1*Cv1*Cvx/[(Cv1+Cv2)*(Cv1+Cv2+Cvx)] \\ &= Va1*[Cvx/(4Cv2)].\end{aligned} \quad \text{(eq-5)}$$

It is known that the variation ΔVa2 may be inversely proportional to the second capacitance Cv2 substantially. When the first capacitance Cv2 is adjusted to be equal to the second capacitance Cv2 substantially, the variation ΔVa2 may be inversely proportional to the first capacitance Cv1 substantially as well. The second capacitor C2 and the corresponding first capacitor C1 may correspond to a touch portion of a touch panel. The touch panel may include a plurality of touch portions. According to an embodiment of the present invention, the touch detection device 100 may correspond to a touch portion, and the calibration parameter P may correspond to the area of the touch portion. Details may be as below.

Figure 4:
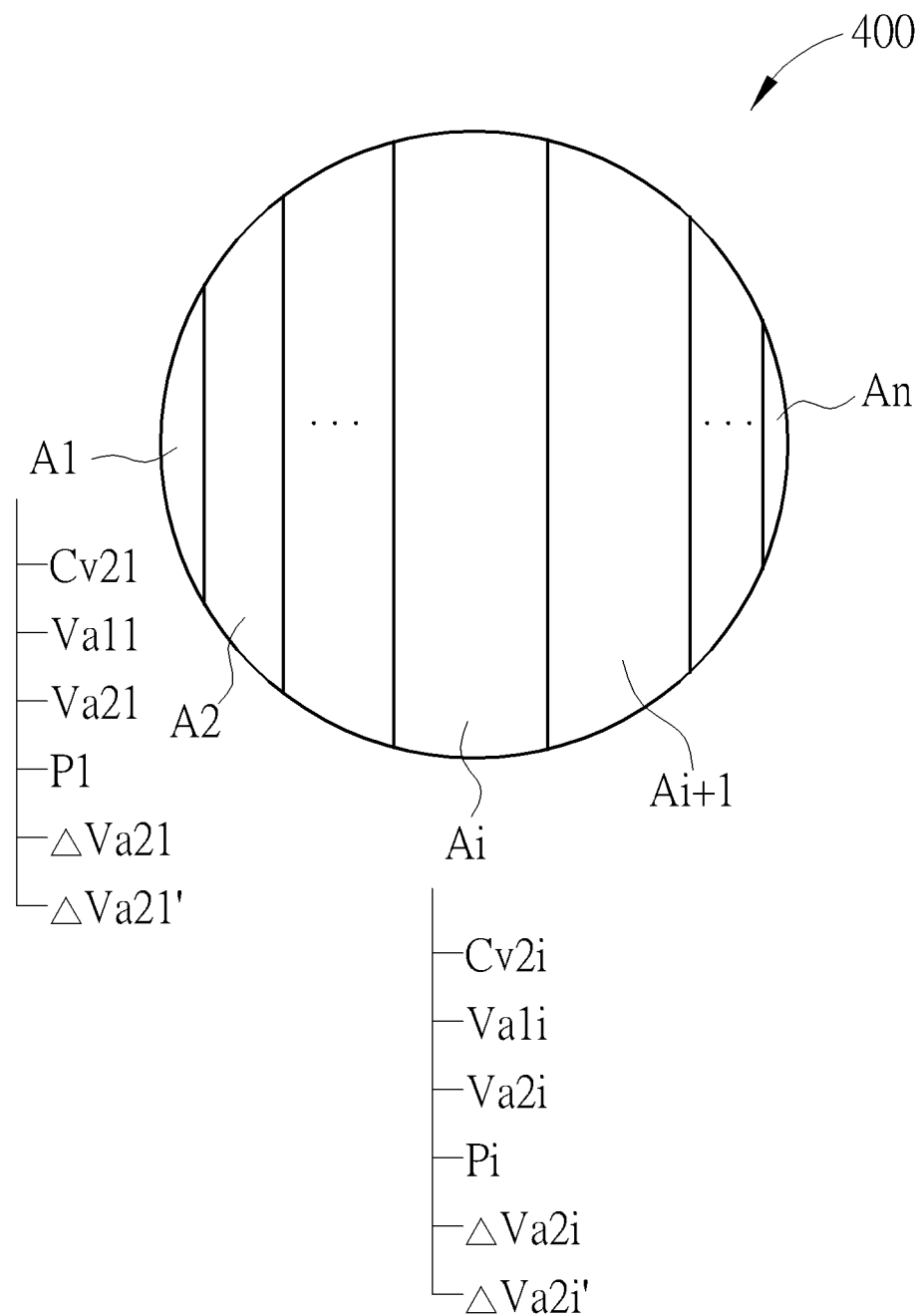
FIG. 4 illustrates n touch portions of a touch panel according to an embodiment of the present invention.

FIG. 4 illustrates n touch portions A1 to An of a touch panel 400 according to an embodiment of the present invention. The shape of the touch panel 400 may be other shape and not limited to a circle. However, a circular shape is used here as an example. As seen in FIG. 4, the areas of the touch portions A1 to An are not identical. For example, the area of the touch portion A1 may be much smaller than the area of the touch portion Ai. The variables i and n mentioned here may be positive integers, and 1<i<(i+1)<n. The areas of the touch portions being different may occur when the shape of the touch panel is non-rectangular, non-regular, elliptical or circular. The second capacitance C2 may correspond to an area of a corresponding touch portion, for example, a greater area of the touch portion may be associated with the greater second capacitance Cv2. The variation ΔVa2 generated according to the second signal Sa2 before and after the touch event may be derived as Va1*[Cvx/(4Cv2)] so as to be inversely proportional to the second capacitance Cv2 (as described in equation (eq-5)). Hence, the variation ΔVa2 generated by an external object on the touch portion A1 may be different from the variation ΔVa2 generated by the identical external object (e.g. an identical stylus or an identical finger) on the touch portion Ai. This may lead to lower accuracy or linearity of touch control. For example, when a gesture is performed so that a finger moves across a plurality of touch portions of the touch panel, the variations ΔVa2 corresponding to the touch portions may be different from one another because the touch portions may have different areas, and the success rate of detection may therefore be decreased since it may fail to recognize a gesture completely. According to an embodiment of the present invention, the calibration parameter P in step 230 may be proportional to the second capacitance Cv2, and the variation of the voltage level of the second signal of each touch portion may be calibrated. Table 1 is as follows:

TABLE 1

| The touch portion | The corresponding second capacitance | The voltage level of the corresponding first signal | Variation of the voltage level of the corresponding second signal | The corresponding calibration parameter | The calibrated variation |
|---|---|---|---|---|---|
| A1 | Cv21 | Va11 | $\Delta Va21 = Va11*Cvx/(4Cv21)$ | P1 (being proportional to Cv21) | $\Delta Va21' = k(Va11*Cvx)$ |
| Ai | Cv2i | Va1i | $\Delta Va2i = Va1i*Cvx/(4Cv2i)$ | Pi (being proportional to Cv2i) | $\Delta Va2i' = k(Va1i*Cvx)$ |

As shown in table 1, the touch portion Ai may correspond to the second capacitance Cv2$i$. As described in equation (eq-5), the variation $\Delta Va2i$ of the voltage level of the second signal generated after the touch event has been triggered may be derived as Va1$i$*(Cvx/4Cv2$i$). Hence, by setting the calibration parameter Pi proportional to the second capacitance Cv2$i$ such as setting the calibration parameter Pi as a multiple of the second capacitance Cv2$i$, the calibration performed in step 230 may be multiplying the variation $\Delta Va2i$ by the calibration parameter Pi. A calibrated variation $\Delta Va2i'$ being not affected by the second capacitance Cv2$i$ may be obtained, where $\Delta Va2i'=k(Va1i*Cvx)$. The parameter k here may be a constant selected by engineering requirement. Similarly, the variable i mentioned above may be replaced by an integer 1 so as to obtain the calibrated variation $\Delta Va21'$ being equal to k (Va11*Cvx). Assuming the first signal Sa1 (caused by the touch event) corresponding to the touch portion A1 is identical to the first signal Sa1 corresponding to the touch portion Ai, the calibrated variable $\Delta Va21'$ corresponding to the touch portion A1 may be equal to the calibrated variable $\Delta Va2i'$ corresponding to the touch portion Ai. Hence, the decrease of accuracy of touch detection caused by various areas and shapes of the touch portions may be prevented. A function cali( ) may be used to describe the calibration. Take the touch portion Ai as an example, the calibration may be performed as equation (eq-6):

$$\Delta Va2i' = cali(\Delta Va2i, Pi) \quad \text{(eq-6)}$$
$$= \Delta Va2i * Pi$$
$$= Va1i * [Cvx/(4Cv2i)] * Pi$$
$$= k(Va1i * Cvx).$$

Figure 5:
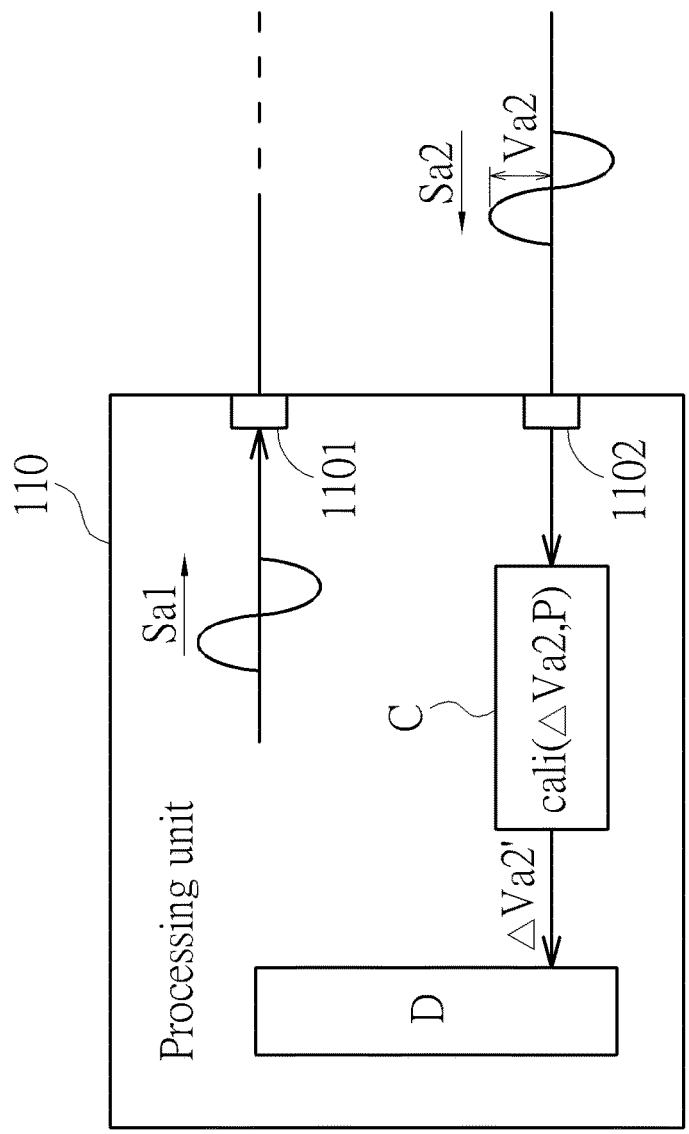
FIG. 5 illustrates a block diagram of the processing unit according to an embodiment of the present invention.

Assuming that the voltage levels Va11 to Va1$n$ of the first signal corresponding to the touch portions are identical substantially, the calibrated variations $\Delta Va21'$ to $\Delta Va2n'$ corresponding to an identical third capacitance Cvx may be equal to one another substantially. As mentioned above, the variation $\Delta Va2$ may be maximized by adjusting the first capacitance Cv1 to be equal to the second capacitance Cv2 substantially, so the calibration parameter P may be proportional to the first capacitance Cv1 when the calibration parameter P is proportional to the second capacitance Cv2. FIG. 5 illustrates a block diagram of the processing unit 110 according to an embodiment of the present invention. The processing unit 110 may include a calibration unit C and an analysis unit D used to calibrate the variation $\Delta Va2$ of the voltage level Va2 of the second signal Sa2 according to the calibration parameter P to generate the calibrated variation $\Delta Va2'$ for the analysis unit D to determine whether a touch event has been triggered. The calibration may be expressed with the function cali( ).

The calibration in step 230 may not be limited to multiplying the variation $\Delta Va2$ with the calibration parameter P. According to an embodiment of the present invention, the calibration may be searching a lookup table or performing other mathematical calculation according to the calibration parameter P. The processing unit 110 and its internal function units may be integrated into a controllable hardware circuit. For example, the processing unit 110 may be implemented into an integrated circuit (IC) including digital logic gates and/or analog electronic components. According to an embodiment of the present invention, the first capacitor C1 and the processing unit 110 may be integrated into an IC.

Figure 6:
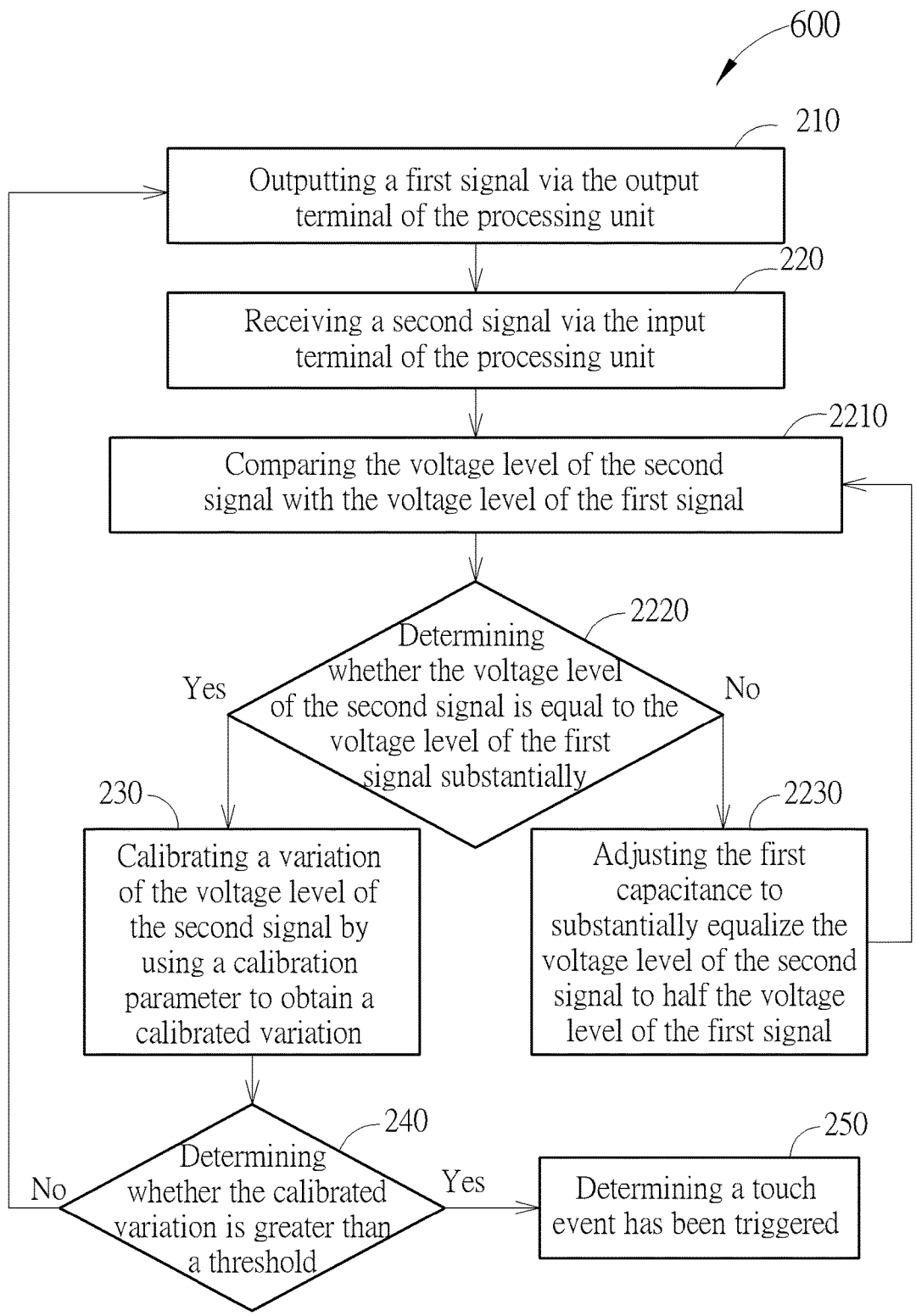
FIG. 6 illustrates a flowchart of a touch detection method according to an embodiment of the present invention.

FIG. 6 illustrates a flowchart of a touch detection method 600 according to an embodiment of the present invention. The method 600 may further include steps 2210, 2220 and 2230 by comparing with the method 200 shown in FIG. 2. The touch detection method 600 may include:

Step 210: outputting a first signal Sa1 via the output terminal 1101 of the processing unit 110;

Step 220: receiving a second signal Sa2 via the input terminal 1102 of the processing unit 110;

Step 2210: comparing the voltage level Va2 of the second signal Sa2 with the voltage level Va1 of the first signal Sa1;

Step 2220: determining whether the voltage level Va2 of the second signal Sa2 is equal to the voltage level Va1 of the first signal Sa1 substantially; if so, perform step 230; else perform step 2230;

Step 2230: adjusting the first capacitance Cv1 to substantially equalize the voltage level Va2 of the second signal Sa2 to half the voltage level Va1 of the first signal Sa1;

Step 230: calibrating a variation $\Delta Va2$ of the voltage level Va2 of the second signal Sa2 by using a calibration parameter P to obtain a calibrated variation $\Delta Va2'$;

Step 240: determining whether the calibrated variation $\Delta Va2'$ is greater than a threshold; if so, perform step 250; else perform step 210; and Step 250: determining a touch event has been triggered.

According to an embodiment of the present invention, the first capacitor C1 may have the adjustable first capacitance Cv1. The first capacitance Cv1 may be adjusted according to the result of comparing the voltage level Va2 with the voltage level Va1 in steps 2210 to 2230 to equalize the first capacitance Cv1 to the second capacitance Cv2. By performing steps 2210 to 2230, the first capacitance Cv1 and the second capacitance Cv2 may be obtained, and the calibration parameter P corresponding to the second capacitance Cv2 may be derived. Taking FIG. 4 as an example, the calibration parameters P1 to Pn corresponding to the touch portions A1 to An respectively may be derived. The first capacitance Cv1, the second capacitance Cv2 and the calibration parameter P may be obtained and stored in a memory unit. The memory unit may be hardware, a dynamic random-access memory (DRAM) unit, and/or a read-only memory (ROM) unit. Taking FIG. 4 as an example, after performing touch detection at a touch portion Ak of the touch panel 400, a count of a counter may be increased so as to perform a following touch detection at the touch portion Ak+1. Touch detection corresponding to the touch portions A1 to An may be performed, where k and n are positive integers, and $1 \leq k < n$. For example, increasing the count in the counter may be performed by adding 1 to the count till the touch portions to be detected have been detected or all the touch portions have been detected. A sequence of detecting the touch portions may be programmable.

In summary, the touch detection method disclosed according to embodiments of the present invention may allow a touch detection device not to be switched into an input mode or an output mode, so the circuit structure may be simpler. By using calibration parameters, the variables of voltage levels corresponding to a plurality of touch portions may be calibrated. The gain triggered by touch events may be normalized. Error detections may be avoided effectively, and correctness of touch detection may be improved. For users and developers of smart phones, smart watch, wearable devices, automobile electronics and/or smart appliances, the present invention is believed to be helpful.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch detection method of a touch detection device, the touch detection device comprising a processing unit, a first capacitor and a second capacitor, a first terminal of the first capacitor being coupled to an output terminal of the processing unit, a second terminal of the first capacitor being coupled to an input terminal of the processing unit and a first terminal of the second capacitor, a second terminal of the second capacitor being coupled to a ground terminal, the touch detection method comprising:
   outputting a first signal via the output terminal of the processing unit;
   receiving a second signal via the input terminal of the processing unit, wherein a voltage level of the second signal corresponds to a voltage level of the first signal, a first capacitance of the first capacitor and a second capacitance of the second capacitor;
   calibrating a variation of the voltage level of the second signal by using a calibration parameter to obtain a calibrated variation; and
   determining a touch event has been triggered by the processing unit if the calibrated variation is greater than a threshold;
   wherein the calibration parameter is proportional to the first capacitance.

2. The touch detection method of claim 1, wherein the first capacitance is substantially equal to the second capacitance.

3. The touch detection method of claim 1, wherein the calibration parameter is proportional to the second capacitance.

4. The touch detection method of claim 1, wherein the touch detection device is corresponding to a touch portion, and the calibration parameter is corresponding to an area of the touch portion.

5. The touch detection method of claim 1, further comprising:
   storing the calibration parameter to a storage unit.

6. The touch detection method of claim 1, further comprising:
   increasing a count of a counter so as to perform a following touch detection.

7. The touch detection method of claim 1, wherein the first signal is a first analog signal, and the second signal is a second analog signal.

8. The touch detection method of claim 1, wherein the touch event is triggered when an external object touches the touch detection device, the external object comprises a third capacitance, and the variation of the voltage level of the second signal is corresponding to the first capacitance, the second capacitance, the third capacitance and the voltage level of the first signal.

9. The touch detection method of claim 8, wherein the first capacitance is substantially equal to the second capacitance.

10. The touch detection method of claim 8, wherein the calibration parameter is proportional to the second capacitance.

11. The touch detection method of claim 8, wherein the touch detection device is corresponding to a touch portion, and the calibration parameter is corresponding to an area of the touch portion.

12. The touch detection method of claim 8, further comprising:
    storing the calibration parameter to a storage unit.

13. The touch detection method of claim 8, further comprising:
    increasing a count of a counter so as to perform a following touch detection.

14. The touch detection method of claim 1, further comprising:
    comparing the voltage level of the second signal with the voltage level of the first signal; and
    adjusting the first capacitance to substantially equalize the voltage level of the second signal to half the voltage level of the first signal when the voltage level of the second signal fails to be substantially equal to half the voltage level of the first signal.

15. The touch detection method of claim 14, wherein the first capacitance is substantially equal to the second capacitance.

16. The touch detection method of claim 14, wherein the calibration parameter is proportional to the second capacitance.

17. The touch detection method of claim 14, wherein the touch detection device is corresponding to a touch portion, and the calibration parameter is corresponding to an area of the touch portion.

18. The touch detection method of claim 14, further comprising:
    storing the calibration parameter to a storage unit.

19. The touch detection method of claim 14, further comprising:
    increasing a count of a counter so as to perform a following touch detection.

\* \* \* \* \*